Nov. 9, 1971   H. BLACK   3,618,446
WOOD FASTENERS
Filed Feb. 26, 1970

INVENTOR
HUGH BLACK

BY
*Alter and Weiss*
ATTORNEYS

United States Patent Office
3,618,446
Patented Nov. 9, 1971

3,618,446
WOOD FASTENERS
Hugh Black, Downers Grove, Ill. (Liner Cove Road,
P.O. Box 556, Waynesville, N.C. 28786)
Continuation-in-part of application Ser. No. 756,844,
Sept. 3, 1968. This application Feb. 26, 1970, Ser.
No. 14,561
Int. Cl. F16b 15/00
U.S. Cl. 85—11         2 Claims

ABSTRACT OF THE DISCLOSURE

Wood fasteners having body sections comprising converging peripheral resilient side walls. The body section includes an elongated hole therein. The elongated hole provides maintaining means for retaining the fasteners on a carrier. The hole further provides expansion space for wood displaced as the fastener is driven into abutting wood sections which are being joined together therewith. Displaced wood acts in conjunction with the hole to lock the wood and fastener together.

---

The invention relates in general to wooden fasteners and, in particular, to characterized wood fasteners that are amenable to being driven directly into wood by industrial type staplers without any pre-slotting of the wood. This application is a continuation-in-part of my application filed Sept. 3, 1968, Ser. No. 756,844 and entitled Wood Fasteners, now abandoned.

The furniture industry is continually searching for new and improved ways of invisibly joining together sections of material such as wood. For example, wood sections can be invisibly joined together using glue. The glue, however, tends to dry out and loose its adhesive characteristic such that the joined sections part, much to the consternation of the owner of the furniture. The life of the article of furniture can, of course, be prolonged by techniques such as dovetailing separate sections. The dovetailing, of course, appreciably increases the cost of the furniture. In addition, when the dovetailing arrangement is used, skilled craftsmen and/or high priced tools are required, rather than technicians. Alternatively, well-known nails or screws can be used for attaching the sections together. The drawback in the use of well-known nails or screws is, among other things, that time is required to make the fasteners invisible. Thus, the nails and screws require countersunk holes and wood putty to cover the visible top portions of the nails or screws. Thus, the results are never top quality. Even a more serious drawback in the use of nails is that nails do not really clamp the separate sections together; while drilled holes are required when using screws.

Another serious drawback of presently known fasteners is that they are not adapted to general use with plywoods or pressed woods. Thus, modern woods are not commonly or extensively used in better made furniture. The extensive use of such woods for the furniture industry is awaiting the invention of a fastener capable of securely joining and clamping together pressed wood sections with a low incidence of mis-shaping and cracking of the wood.

Another alternative fastener is the use of the keystone shaped fasteners disclosed in the above-mentioned original application. These fasteners are generally used in connecting together abutting wood sections by inserting the fasteners in slots that run transverse to the abutting sections. The major drawback in the use of such fasteners is the necessity of pre-slotting the wood pieces. Even when the wood is pre-slotted most available wood fasteners having wedge-shaped transverse body sections and converging walls tend to overstress the wood sections.

Accordingly, it is an object of the present invention to provide a wood fastener capable of use in joining together all types of wood sections including pressed wood sections without overstressing the wood sections.

A related object of the present invention is to provide wood fasteners capable of joining together abutting sections of wood wherein the wood fasteners are shaped to facilitate their being forcibly inserted into the wood through the use of industrial type staplers.

Yet, another object of the invention is to provide wood fasteners which when forced into the wood, displace the wood in a manner that locks the fasteners into the wood joint of the wood sections being joined together.

A preferred embodiment of the present invention features wood fasteners having a body section having converging peripheral walls. The peripheral walls are sufficiently resilient to aid in preventing the overstressing of the wood of the "displaced wood effect" and, in addition, the body section has an elongated hole therein which acts to receive some of the displaced wood so as to preclude the displaced wood from cracking or causing cracks in the wood sections being joined together. Further, the elongated hole acts as a means for mounting the fasteners on a carrier for purposes of transportation and for automatically feeding the fasteners to join together materials by power means.

The above-mentioned and other features and objects of this invention and the manner of obtaining them will become more apparent, and the invention itself will be best understood by reference to the following description of an embodiment of the invention taken in conjunction with the accompanying drawings, in which.

Figure 1:
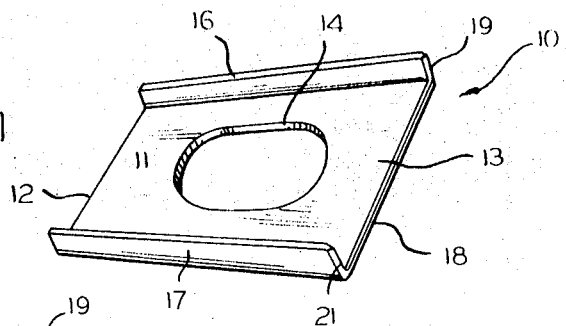
FIG. 1 is a pictorial representation of one embodiment of the present invention.
Figure 2:
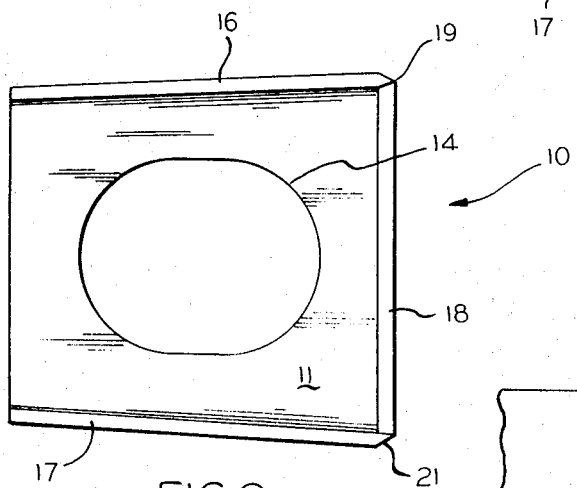
FIG. 2 is a top view of the pictorial representation shown in FIG. 1.

Similar characters of reference indicate corresponding parts and pictures throughout the various views, and referring now to the same, the fastener of FIG. 1 is generally designated by the number 10. The fastener 10 comprises a flat main body section 11 having a slightly wedged shape. That is, the main portion of the body is narrower at its trailing or posterior end 12, than it is at its front or anterior end 13.

At the center of the body 11 is an elongated hole 14. This hole, as will be described further in the specification, is an essential feature of the invention. The hole 14 is approximately centered with regard to the outer peripheral dimensions of the main body section 11.

Means are provided for enabling the fastener to be forced into the wood pieces to be joined together. More specifically, the leading edges of the main body section 11 such as edge 18, and the leading edges of walls 16 and 17 such as edges 19 and 21, respectively, come to a point or are sharpened as shown in the drawing. This enhances forcing the wood fastener 10 into the wood to be joined together using an industrial type stapler. In this way, no pre-slotting is necessary in the use of the wood fastener.

Figure 3:
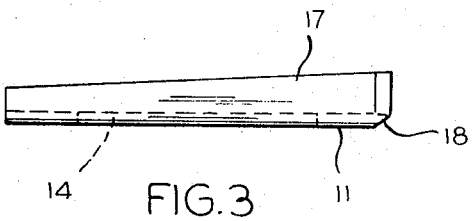
FIG. 3 is a side view of the pictorial representation shown in FIG. 1.

FIG. 3 generally shows the relative height of the walls related to the thickness of the main body section 11, and another view showing the length of the elongated hole 14. Also shown is the pointed front section leading edge 18 of the main body section 11 at the anterior end 13 of the main body section. It should be recognized that the sharpened edges need not come to a point, as shown, as the result of being formed of equilateral triangles; any other type of a biased, sharpening arrangement could serve equally well to enable the wood fastener to enter the wood without pre-slotting.

The fastener 10 is ideally suited for use in mitre joints, although it may be used in any other type of wooden joints, such as the joints used in connecting legs to the underside of the tables or the like.

Figure 5:
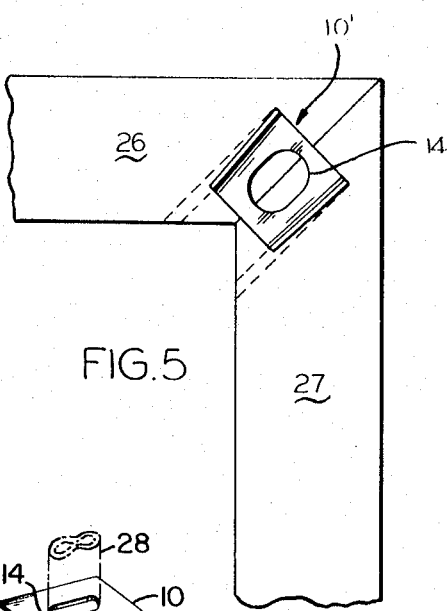
FIG. 5 illustrates a section of FIG. 4 showing the fastener holding the two pieces of wood together.
Figure 4:
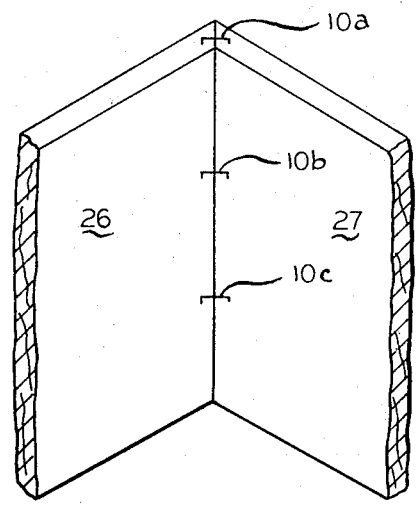
FIG. 4 illustrates a cross-section of two abutting pieces of wood joined together by the inventive fastener.

FIGS. 4 and 5 show the use of the wood fastener in a mitre joint, particularly on the inside corner of the mitre joint where the small slot made in the wood by the fastener would be virtually invisible. FIG. 4 shows three inventive fasteners used in the joint. The first fastener is forced in transverse to the wood sections being joined together, whereas, the other two fasteners are forced into the mitred corner as shown in the sectional view of FIG. 5.

More specifically, if wood piece 26 is to be joined to wood piece 27, a fastener such as 10a would be forced transversely into both sections 26 and 27 simultaneously through the use of an industrial type stapler device. Other wood fasteners, 10, such as 10b and 10c would be forced in as shown in FIG. 5. As shown therein, the leading edge of the wood fastener is forced in and provides a path for the trailing edge. The tapered wedge-like shape of the fastener forces the wood together. The displacement of the wood would normally cause cracking in the wood. However, some of the displaced wood is enabled to return to its near normal position by filling the elongated hole 14. At the same time when the wood does fill the hole, it further locks the fastener into place. Of course, the wedging also locks the fastener into place. Thus, the joint between wood section 26 and 27 is firmly held together by the fasteners used without the necessity for glue or without the need of any pre-channeling of the wood. In this manner, the inventive fastener drastically reduces furniture manufacture and production costs by making it possible for less expensive woods to be utilized and by enabling less skilled labor to fabricate the furniture.

Figure 6:
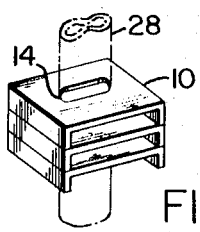
FIG. 6 shows a plurality of the fasteners mounted on a carrier rod.

FIG. 6 diagrammatically shows how the fasteners 10 may be mounted by threading a rod carrier 28 through hole 14 of the fasteners. The carrier is used for transportation, storage and also for use in conjunction with power feed guns.

In addition, the fastener opens up the field for many new designs. When the fastener is inserted into wood, the converging walls clamp the woods together. The elongated hole and resilient walls prevent damaging the wood and assure that the wood is secured together in a way that is practically invisible without depending entirely on glue which has a tendency to dry and thereby reduce the life of the furniture.

While the fastener has been described using wood as the material being joined together, it should be understood that the fastener is equally effective in joining together other types of materials, such as plastics.

While the principles of the invention have been described above in connection with a specific apparatus and applications, it is to be understood that this description is made only by way of example, and not as a limitation on the scope of the invention.

What is claimed is:

1. A fastener for securely joining material sections together, said fastener being resilient to preclude over compressing said material sections being joined together, said fastener comprising an elongated body section having a pair of opposed substantially parallel surfaces and having a leading end and a trailing end, peripheral walls extending upwardly from only a single one of said surfaces and being integral to said body section along each side edge of said body section to form a channel like unit, said walls converging from the leading end to the trailing end of said fastener, the leading end of said body section being sharpened and extending between said peripheral walls in a straight line, and said body section having a centrally located hole therein, said hole having an area equal to at least ten percent of the area of said body section, whereby said hole is sufficiently large to be used for mounting a plurality of said fasteners on a carrier rod and also acting to prevent splitting of the material sections joined together even when said material sections are not pre-slotted.

2. The fastener of claim 1 wherein said walls are progressively tapered throughout the extent thereof reducing the height of said walls from the leading end to the trailing end of the said fastener thereby minimizing any wedge effect caused by said fastener.

References Cited

UNITED STATES PATENTS

| | | | |
|---|---|---|---|
| 496,625 | 5/1893 | Tuttle | 85—11 |
| 1,368,460 | 2/1921 | Siegler | 85—11 |
| 1,413,737 | 4/1922 | Jensen | 85—11 |
| 2,433,914 | 1/1948 | Lang | 206—56 DF X |
| 2,886,815 | 5/1959 | Young | 227—120 |
| 2,918,705 | 12/1959 | Pearce | 227—120 X |
| 3,266,361 | 8/1966 | Gravenhorst et al. | 85—11 |
| 3,431,810 | 3/1969 | Black | 85—11 |
| 3,459,396 | 8/1969 | Buttriss | 85—11 X |

FOREIGN PATENTS

| | | | |
|---|---|---|---|
| 1,245,130 | 9/1960 | France | 85—11 |
| 446,610 | 5/1936 | Great Britain | 287—20.92 K |

RAMON S. BRITTS, Primary Examiner

U.S. Cl. X.R.

206—56 DF; 227—120; 287—20.92 K

Disclaimer 3,618,446.—*Hugh Black*, Downers Grove, Ill. WOOD FASTENERS. Patent dated Nov. 9, 1971. Disclaimer filed Apr. 9, 1979, by the assignee, *Woodloc Incorporated*.

The term of this patent subsequent to Mar. 11, 1986, has been disclaimed.

[*Official Gazette June 19, 1979.*]